US012504535B2

United States Patent
Veronesi et al.

(10) Patent No.: US 12,504,535 B2
(45) Date of Patent: Dec. 23, 2025

(54) SYSTEM AND METHOD FOR ANATOMICALLY ALIGNED MULTI-PLANAR RECONSTRUCTION VIEWS FOR ULTRASOUND IMAGING USING A GEOMETRICAL MODEL

(71) Applicant: GE Precision Healthcare LLC, Wauwatosa, WI (US)

(72) Inventors: Federico Veronesi, Bologna (IT); Olivier Gerard, Oslo (NO)

(73) Assignee: GE Precision Healthcare LLC, Wauwatosa, WI (US)

( * ) Notice: Subject to any disclaimer, the term of this patent is extended or adjusted under 35 U.S.C. 154(b) by 110 days.

(21) Appl. No.: 17/205,482

(22) Filed: Mar. 30, 2021

(65) Prior Publication Data

US 2022/0317294 A1    Oct. 6, 2022

(51) Int. Cl.
*A61B 8/00* (2006.01)
*G01S 7/52* (2006.01)
*G01S 15/89* (2006.01)

(52) U.S. Cl.
CPC ........ *G01S 15/8977* (2013.01); *A61B 8/5207* (2013.01); *G01S 7/52053* (2013.01); *G01S 15/8993* (2013.01)

(58) Field of Classification Search
CPC ............. G01S 15/8977; G01S 7/52053; G01S 15/8993; G01S 7/52074; A61B 8/5207;
(Continued)

(56) References Cited

U.S. PATENT DOCUMENTS 6,174,285 B1 * 1/2001 Clark ................... A61B 8/0883
600/443
8,265,363 B2    9/2012 Orderud et al.
(Continued)

FOREIGN PATENT DOCUMENTS

WO    WO-2004095378 A1 * 11/2004 ............. G06T 15/08
WO    WO-2020148450 A1 *  7/2020 ........... A61B 1/0005

OTHER PUBLICATIONS

J. Hansegard et al., "Real-time active shape models for segmentation of 3D cardiac ultrasound", Computer Analysis of Images and Patterns, Berlin, Germany, Spring, 2007, vol. 4673, LNCS, pp. 157-164.

*Primary Examiner* — Joel Lamprecht
*Assistant Examiner* — James F McDonald, III
(74) *Attorney, Agent, or Firm* — Boyle Fredrickson, S.C.

(57) ABSTRACT

The system and method provide an automatic aligned and co-oriented display of a 3D anatomical model adjacent to one or more 2D MPR views of a 3D echocardiographic image dataset. The 3D model is presented in alignment with the displayed 3D and 2D images to provide an indication of the orientation of each of the 3D volume and 2D planar views with respect to the 3D model and to one another. The 3D model can include labels or information regarding an anatomical feature(s) of interest to enable the user to readily visualize the disposition of the 2D planar view relative to the anatomical feature(s) in the 3D model. While interacting with the 2D views or 3D model, the 2D views and 3D anatomical model will change orientation simultaneously, with the representation of the 2D plane in the 3D model moving in correspondence with the 2D image.

10 Claims, 7 Drawing Sheets

(58) Field of Classification Search
CPC .. A61B 8/00; A61B 8/483; A61B 8/52; A61B 8/5246; A61B 8/0883; A61B 8/461; A61B 8/466; A61B 8/467; A61B 8/486; A61B 8/488; A61B 8/5215; G06V 2201/03; G06T 2207/10136; G06T 3/4038; G06T 7/344; G06T 17/00; G06T 2207/10132

See application file for complete search history.

(56) References Cited

U.S. PATENT DOCUMENTS

| | | | |
|---|---|---|---|
| 2006/0072808 A1* | 4/2006 | Grimm | G06T 7/33 |
| | | | 382/151 |
| 2007/0255139 A1* | 11/2007 | Deschinger | A61B 8/465 |
| | | | 600/443 |
| 2012/0165671 A1* | 6/2012 | Hill | A61B 8/14 |
| | | | 600/443 |
| 2013/0035596 A1* | 2/2013 | Ionasec | G06T 7/344 |
| | | | 600/450 |
| 2013/0173230 A1* | 7/2013 | Carbonera | G06T 17/00 |
| | | | 703/2 |
| 2015/0112196 A1* | 4/2015 | Tanaka | A61B 8/463 |
| | | | 600/437 |
| 2016/0038121 A1* | 2/2016 | Waechter-Stehle | A61B 8/523 |
| | | | 600/443 |
| 2017/0325785 A1* | 11/2017 | Lieblich | A61B 8/4483 |
| 2018/0214129 A1* | 8/2018 | Dufour | A61B 8/085 |
| 2018/0344290 A1 | 12/2018 | Veronesi et al. | |
| 2020/0074664 A1* | 3/2020 | Weber | G06T 17/00 |
| 2021/0077037 A1* | 3/2021 | Kunio | G06T 7/0014 |

* cited by examiner

SYSTEM AND METHOD FOR ANATOMICALLY ALIGNED MULTI-PLANAR RECONSTRUCTION VIEWS FOR ULTRASOUND IMAGING USING A GEOMETRICAL MODEL

BACKGROUND OF THE INVENTION

Embodiments of the subject matter disclosed herein relate to medical imaging, and more particularly, to the display of ultrasound imaging devices to a practitioner.

An ultrasound imaging system typically includes an ultrasound probe that is applied to a patient's body and a workstation or device that is operably coupled to the probe. The probe may be controlled by an operator of the system and is configured to transmit and receive ultrasound signals/image data that are processed into an ultrasound image by the workstation or device. The workstation or device may show or display the ultrasound images through a display device. For the display of the ultrasound images, the image data/dataset obtained by the probe is utilized by the ultrasound imaging system to generate multiple images of the structure being imaged by the probe.

In one example of these types images, the image data/dataset is a three dimensional (3D) image dataset that can be rendered into a 3D volume that is utilized to generate images of multiple planes of the imaged structure that are presented to the user of the ultrasound imaging system. The process for producing these planar images involves multi-planar reconstruction (MPR) and allows effective display of 3D image dataset by providing multiple planes, which are typically three (3) orthogonal 2D planes, in association with the 3D volume. The 3D volume 1000 is sliced at different locations and with different orientation to form the 2D planar views or images 1002 that are presented with the 3D volume 1000 in the MPR display 1004, as shown in FIG. 1.

However, when using MPR, either in 3D static images or on 4D echocardiographic images such that the 3D volume and planar images are presented on the display in motion, it is often difficult to understand the location and orientation of the 2D planar slices with respect to the 3D volume and/or the actual anatomy of the patient in order to and navigate to and view the desired areas of the imaged structure of interest.

As a result, it is desirable to develop an imaging system and method for improving the visualization of and navigation within the 3D and 2D images provided in an MPR display.

BRIEF DESCRIPTION OF THE DISCLOSURE

In the present disclosure, 3D and 2D images provided by an ultrasound imaging system utilizing MPR are presented in conjunction with an aligned 3D model of the anatomical structure represented in the images. The system and method provide an automatic, and optionally live, i.e., in motion or in a cine view, aligned and co-oriented display of the 3D anatomical model adjacent to one or more 2D MPR views of a 3D echocardiographic dataset. The 3D model is presented in alignment with each of the displayed 3D and 2D images to provide an indication to the user of the orientation of each of the 3D volume and 2D planar views with respect to the 3D model and to one another. Each 2D planar view is represented in the 3D model to clearly identify the orientation of the 2D planar view relative to the anatomical structure being imaged. In looking at each 2D planar view and the associated 3D model, the user can then immediately and intuitively understand/determine the orientation of the currently displayed data that can be either live or recalled from an associated electronic storage location. In addition, the 3D model assists the user with regard to the navigation of the 3D dataset using the 3D volume and/or 2D planar views by providing known anatomical reference(s) in relation to the displayed views.

The system and method employ the anatomical information provided via the 3D image dataset to create the detailed anatomical 3D model that assists to navigate the user in the 3D echocardiographic data. The display includes the 3D model presented in alignment with the MPR views, with the plane of the 2D MPR view represented within the 3D model. The 3D model can additionally include other labels or information therein regarding an anatomical feature(s) of interest, in order to enable the user to readily visualize the disposition of the 2D planar view relative the anatomical feature(s) identified in the 3D model. The 3D model can also include information relating to other aspects of the images, such as a representation of the probe in order to assist the user in orienting the probe to acquire an improved or optimal image of the structures of interest.

While interacting with the MPR views, when the user manipulates the MPR view, the MPR views and the 3D anatomical model will change orientation simultaneously, either by the rotation of the 3D with the 2D image, or with the representation of the 2D plane in the 3D model moving in correspondence with the 2D image. Additionally, when the user interacts with the 3D model, the corresponding 3D or 2D image will shift, e.g., translate and/or rotate, in accordance with the change in orientation of the 3D model or in position and orientation of the 2D planar view. In this manner the system and method provides accurate information to the user on the orientation of the 2D image using the associated 3D model.

According to one aspect of the disclosure, an ultrasound imaging system includes a probe for obtaining a 3D image dataset on a structure to be imaged, a processor operably connected to the probe and configured to generate a 3D volume and at least one 2D image from the 3D image dataset and a display operably connected to the processor to present the 3D volume and the at least one 2D image on the display, wherein the processor is configured to register a 3D anatomical model to the 3D volume and to display the 3D anatomical model in alignment with the at least one 2D image.

According to another aspect of the disclosure, a method for displaying a three dimensional (3D) anatomical model in alignment with an ultrasound image provided using an ultrasound imaging system including the steps of obtaining a 3D image dataset with the ultrasound imaging system generating a 3D volume and at least one two dimensional (2D) image from the 3D image dataset, registering a 3D anatomical model to the 3D volume and displaying the 3D anatomical model in alignment with the at least one 2D image.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The foregoing summary, as well as the following detailed description of certain embodiments of the present invention, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The following description relates to various embodiments of ultrasound imaging. In particular, systems and methods are provided for visualizing intersection information on ultrasound images with the aid of a three-dimensional (3D) model. A three-dimensional (3D) ultrasound dataset may be acquired using an ultrasound imaging system, such as the ultrasound imaging system depicted in FIG. 2, similar to that disclosed in US Patent Application Publication No. US2018/0344290 entitled Systems And Methods For Displaying Intersections On Ultrasound Images, the entirety of which is expressly incorporated herein by reference for all purposes, and can be used to create a 3D volume and/or one or more 2D planar slices via multi-planar reconstruction (MPR) for presentation on a display for the ultrasound imaging system in association with a 3D model of the anatomical structure being imaged. For example, a graphical user interface, such as the graphical user interfaces depicted in FIGS. 3, 4 and 6 may include a visualization of the 3D model for each MPR 3D/2D image with information displayed thereon regarding the orientation of the image relative to the 3D model, thereby enabling a user to easily navigate the 3D volume. A method, such as the method depicted in FIG. 5, for creating the 3D model from the 3D ultrasound dataset may include generating a 3D model that has been altered to accommodate for the particular anatomy of the patient being imaged to provide a more accurate representation for the 3D model.

It should be appreciated that while the various embodiments are described herein with respect to ultrasound imaging, the methods described herein may be implemented with other 3D imaging modalities, including but not limited to computed tomography (CT), magnetic resonance imaging (MRI), positron emission tomography (PET), single photon emission computed tomography (SPECT), and so on.

Figure 1:
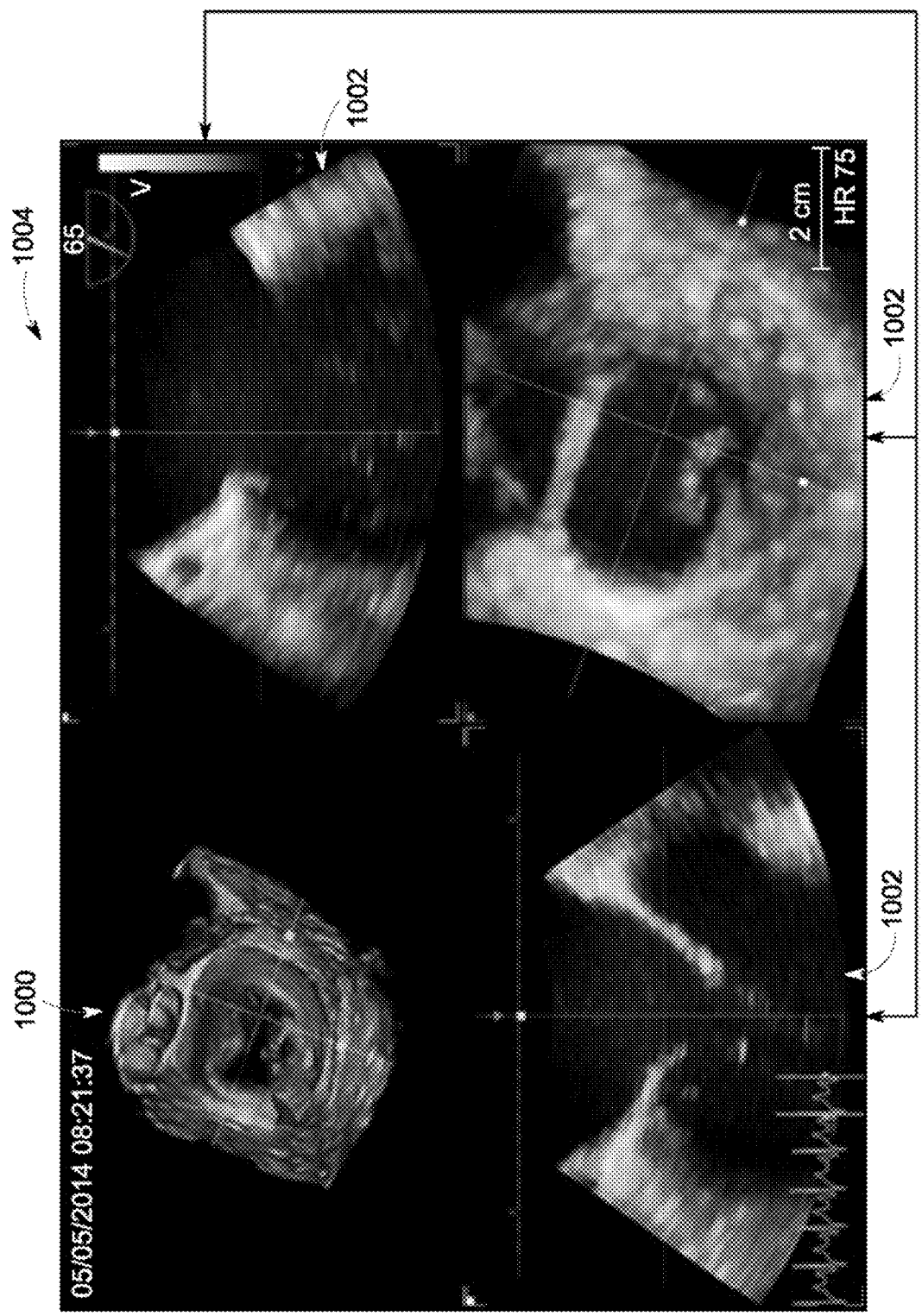
FIG. 1 is an illustration of a prior art display for a multi-planar reconstruction views for an ultrasound imaging system.
Figure 2:
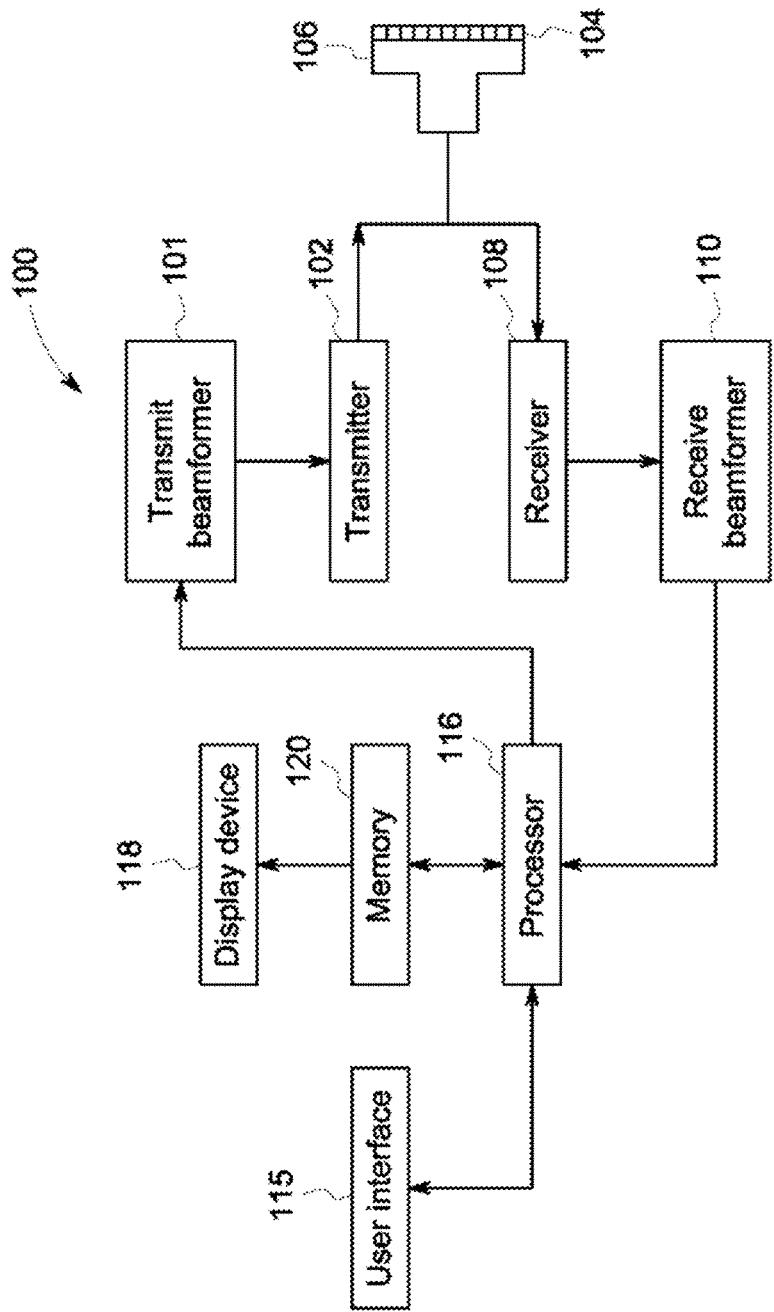
FIG. 2 is a schematic view of an ultrasound imaging system according to an embodiment.

FIG. 2 is a schematic diagram of an ultrasound imaging system 100 in accordance with an embodiment of the invention. The ultrasound imaging system 100 includes a transmit beamformer 101 and a transmitter 102 that drive transducer elements 104 within a probe 106 to emit pulsed ultrasonic signals into a body (not shown). A variety of geometries of probes and transducer elements may be used. The pulsed ultrasonic signals are back-scattered from structures in the body, such as blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. According to some embodiments, the probe 106 may contain electronic circuitry to do all or part of the transmit and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound system.

A user interface 115 may be used to control operation of the ultrasound imaging system 100, including controlling the input of patient data, changing a scanning or display parameter, and the like. The user interface 115 may include a graphical user interface configured for display on a display device 118. The graphical user interface may include information to be output to a user (such as ultrasound images, patient data, etc.) and may also include menus or other elements through which a user may enter input to the computing system. In examples described in more detail below with respect to FIGS. 2-4, the user interface may receive inputs from a user indicating, for example, adjustments to the position of planes to be imaged. The user interface 115 may include one or more of the following: a rotary, a mouse, a keyboard, a trackball, a touch-sensitive display, which can also be the display device 118, hard keys linked to specific actions, soft keys that may be configured to control different functions, and a graphical user interface.

The ultrasound imaging system 100 also includes a processor 116 to control the transmit beamformer 101, the transmitter 102, the receiver 108, and the receive beamformer 110. The processor 116 is in electronic communication with the probe 106. For the purposes of this disclosure, the term "electronic communication" may be defined to include both wired and wireless communications. The processor 116 may control the probe 106 to acquire data. The processor 116 controls which of the elements 104 are active and the shape of a beam emitted from the probe 106. The processor 116 is also in electronic communication with a display device 118, and the processor 116 may process the data into images for display on the display device 118. The processor 116 may include a central processor (CPU)

according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment, the demodulation can be carried out earlier in the processing chain.

The processor 116 is adapted to perform one or more processing operations according to a plurality of selectable ultrasound modalities on the data. The data may be processed in real-time during a scanning session as the echo signals are received. For the purposes of this disclosure, the term "real-time" is defined to include a procedure that is performed without any intentional delay. For example, an embodiment may acquire images at a real-time rate of 7-20 volumes/sec. The ultrasound imaging system 100 may acquire 2D data of one or more planes at a significantly faster rate. However, it should be understood that the real-time volume-rate may be dependent on the length of time that it takes to acquire each volume of data for display. Accordingly, when acquiring a relatively large volume of data, the real-time volume-rate may be slower. Thus, some embodiments may have real-time volume-rates that are considerably faster than 20 volumes/sec while other embodiments may have real-time volume-rates slower than 7 volumes/sec. The data may be stored temporarily in a buffer (not shown) during a scanning session and processed in less than real-time in a live or off-line operation. Some embodiments of the invention may include multiple processors (not shown) to handle the processing tasks that are handled by processor 116 according to the exemplary embodiment described hereinabove. For example, a first processor may be utilized to demodulate and decimate the RF signal while a second processor may be used to further process the data prior to displaying an image. It should be appreciated that other embodiments may use a different arrangement of processors.

The ultrasound imaging system 100 may continuously acquire data at a volume-rate of, for example, 10 Hz to 30 Hz. Images generated from the display may be refreshed at a similar frame-rate. Other embodiments may acquire and display data at different rates. For example, some embodiments may acquire data at a volume-rate of less than 10 Hz or greater than 30 Hz depending on the size of the volume and the intended application. A memory 120 is included for storing processed volumes of acquired data. In an exemplary embodiment, the memory 120 is of sufficient capacity to store at least several seconds worth of volumes of ultrasound data. The volumes of data are stored in a manner to facilitate retrieval thereof according to its order or time of acquisition. The memory 120 may comprise any known data storage medium.

Optionally, embodiments of the present invention may be implemented utilizing contrast agents. Contrast imaging generates enhanced images of anatomical structures and blood flow in a body when using ultrasound contrast agents including microbubbles. After acquiring data while using a contrast agent, the image analysis includes separating harmonic and linear components, enhancing the harmonic component and generating an ultrasound image by utilizing the enhanced harmonic component. Separation of harmonic components from the received signals is performed using suitable filters. The use of contrast agents for ultrasound imaging is well-known by those skilled in the art and will therefore not be described in further detail.

In various embodiments of the present invention, data may be processed by other or different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. The image beams and/or volumes are stored and timing information indicating a time at which the data was acquired in memory may be recorded. The modules may include, for example, a scan conversion module to perform scan conversion operations to convert the image volumes from beam space coordinates to display space coordinates. A video processor module may be provided that reads the image volumes from a memory and displays an image in real time while a procedure is being carried out on a patient. A video processor module may store the images in the memory 120, from which the images are read and displayed.

Figure 3:
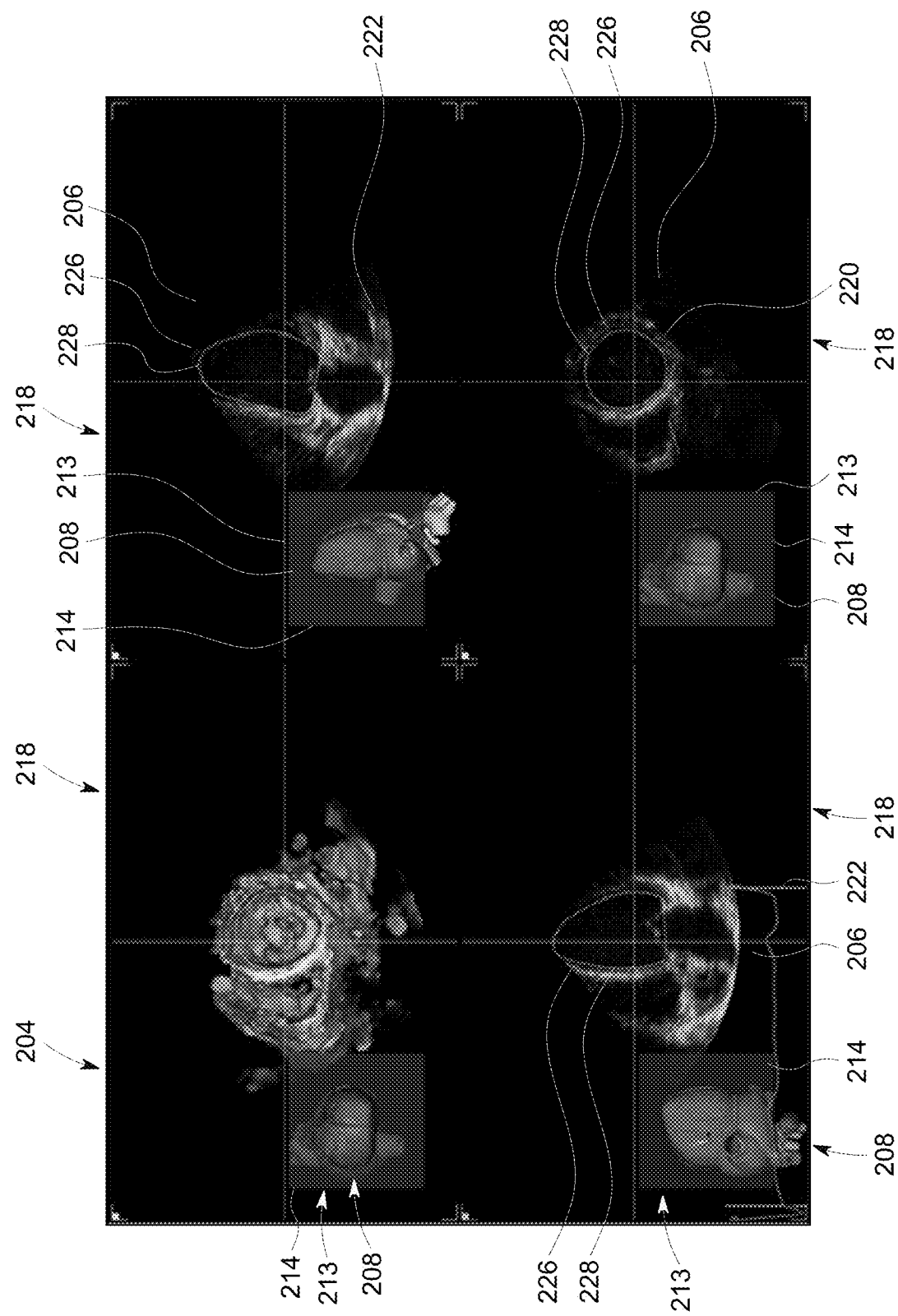
FIG. 3 is an illustration of an exemplary display of multi-planar reconstruction views with an aligned 3D model according to an embodiment.
Figure 4:
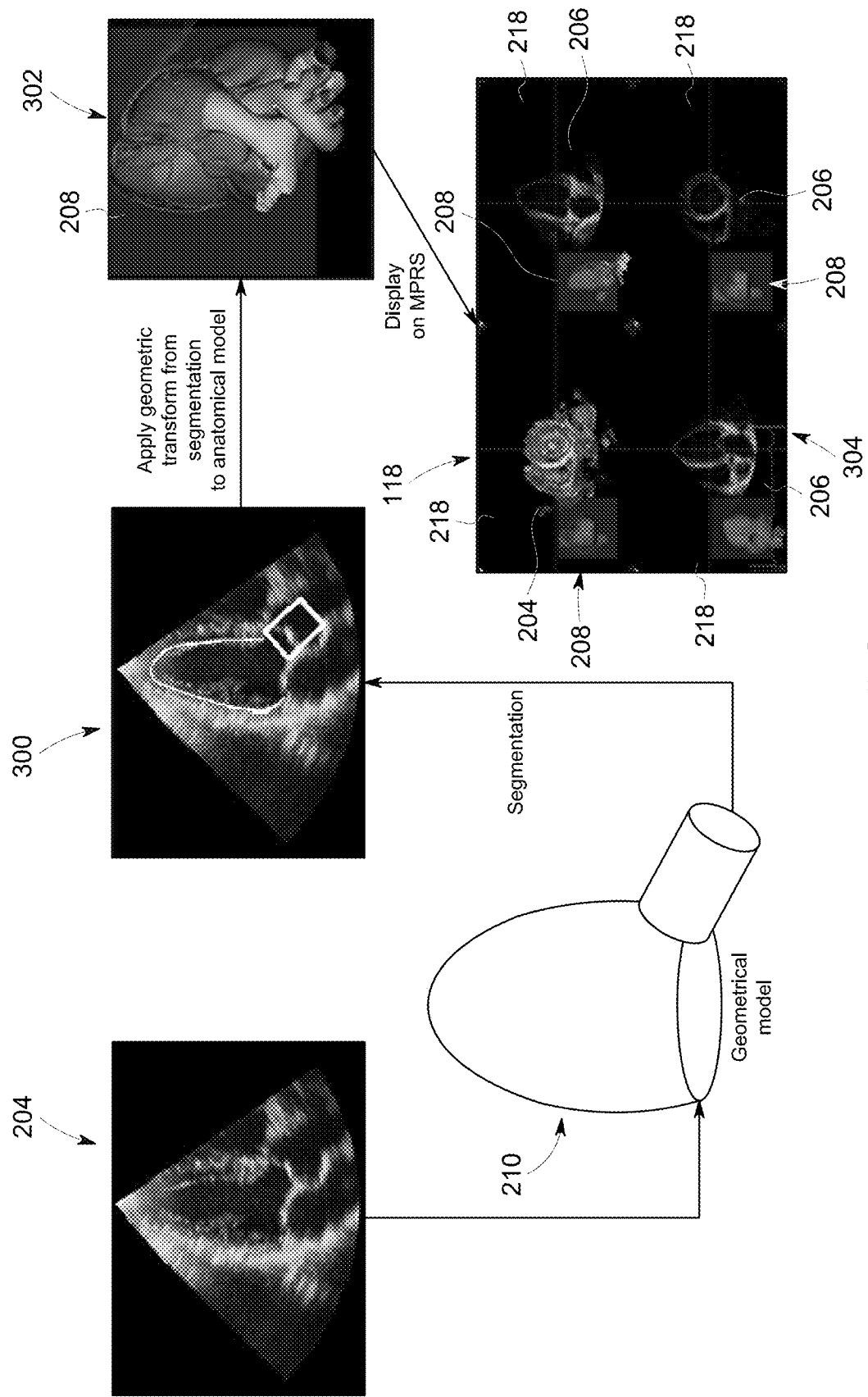
FIG. 4 is an illustration of a method of the registration and alignment of a 3D model with multi-planar reconstruction views according to an embodiment.

Referring now to FIG. 3, when the ultrasound imaging system 100 is operated to image an anatomical structure 200 of a patient, such as the heart 202 when obtained in an echocardiographic procedure, the probe 106 obtains a 3D image dataset that is transmitted to the processor 116 for image generation. In doing so, the processor 116 creates a reconstructed 3D volume/image or rendering 204 of the structure 200. In addition, using the process of multi-planar reconstruction (MPR), the processor 116 generates one or more 2D planar views 206 of predetermined and/or selected slices though the 3D volume/image 204. The 2D planar images 206 are presented on the display 118 in conjunction with the 3D volume/image 204, which in the exemplary embodiment of FIG. 3 shows three (3) 2D planar views 206 in association with the 3D volume/image 204, each disposed in separated windows or frames 218 of the display 118 and identified to indicate the particular view represented by the 2D planar view 206 being displayed, which can be standardized views and/or user-selected views, or combinations thereof.

Along with the creation of the 3D volume/image 204 and 2D planar images 206, the processor 116 generates a 3D anatomical model 208 of the structure being imaged for display in conjunction with the one or more 2D planar views 206 and optionally the 3D volume/image 204. In the method for generation of the 3D anatomical model 208, best shown in the exemplary embodiment of FIG. 4, in block 300 the processor 116 initially registers a geometrical model 210 that generally represents the form of the imaged structure 200 to the 3D volume/image 204 using known image segmentation methods, such as those disclosed in J. Hansegard, F. Orderud, and S. I. Rabben, "Real-time active shape models for segmentation of 3d cardiac ultrasound," in *Computer Analysis of Images and Patterns*. Berlin, Germany: Springer, 2007, Vol. 4673, LNCS, pp. 157-164, and Orderud et al. U.S. Pat. No. 8,265,363, entitled Method And Apparatus For Automatically Identifying Image Views In A 3D Dataset, the entireties of which are each expressly incorporated herein for all purposes, such that the structures and orientation of the geometrical model 210 correspond to those illustrated in the 3D volume/image 204. Subsequently, in block 302 the processor 116 performs a registration between the 3D anatomical model 208 for the imaged structure 200 and the 3D volume/image 204. In this step, the registration is computed by applying a known geometric transformation matrix between the anatomical model 208 and the geometrical model 210 to the transformation matrix resulting from segmentation in order to correlate the structure of the anatomical model 208 to the structures of the 3D volume/image 204, such that the orientation, structure(s) and point(s) of the 3D anatomical model 208 are known and correspond in the 3D coordinate system to those present in the 3D volume/image 204. Once the 3D anatomical model 208 is registered to the 3D volume/image 204, in block 304 the 3D model 208 can be oriented and displayed in association with the 3D volume/image 204 and each 2D planar view/image 206 with the orientation of each 3D model 208 corresponding to the orientation of the particular image 204,206 associated with the individual 3D model 208.

With regard to the registration of the 3D anatomical model 208 to the 3D volume/image 204, in an alternative embodiment the 3D anatomical model 208 can also be a deformable 3D anatomical model 208. In this embodiment, the 3D image dataset used to form the 3D volume/image 204 can be applied to the 3D anatomical model 208 and/or the geometrical model 210, in order to deform or warp the structure of the 3D anatomical model 208 and/or geometrical model 210 to conform more specifically to the actual form of the anatomical structure 200 of the patient being imaged.

After the registration and optional deformation of the 3D anatomical model 208 to the 3D volume/image 204, the model 208 can be presented on the display 118 in conjunction with one or more of the 3D volume/image 204 and the 2D planar MPR images 206, as shown in FIGS. 3-6.

With regard to the manner of the presentation of the model 208 on the display 118, in the illustrated exemplary embodiment of FIG. 3, the model 208 is presented in association with each of the 3D volume/image 204 and the 2D planar images 206 on the display 118, optionally in a scale suitable to show the structure of the model 208 without detracting from the information provided by each of the images 204, 206. However, in alternative embodiments the model 208 can be displayed with any combination of the images 204,206, such as with only each of the number of 2D planar images 206 presented on the display 118. Each of the 2D planar images 206 is associated with a particular default, standardized and/or selected view, or combinations thereof, through the imaged structure 200 in order to provide information about the condition of the imaged structure 200. As the 3D model 208 is registered in the 3D coordinate space with the image 204,206, the presentation of the 3D model 208 for each image is oriented to the plane 212 being viewed in/displayed by the 3D volume/image 204 or containing the 2D planar view 206. As such, the plane 212 of each respective image 204,206 presented on the display 118 is identified within the associated 3D model 208 by an icon 213 of any suitable shape and/or color, such as a shaded square 214 aligned with the plane 212 of each image 204,206. To align the square 214 with the associated image plane 212, the 3D model 208 is rotated/oriented to place the square 214 within the plane of the display 118 on which the images 204,206 are presented. In this manner, on the display 118 the user is presented with the various images 204,206 and the model 208 showing the plane 212 for the specific image 204,206 (as represented by the square 214 within the model 208) and the orientation of the image 204,206 with respect to the model 208, which significantly assists in the understanding of the location of the 2D planar images 206 on the structure 200, and any required navigation to a desired region of interest within the imaged structure 200.

In embodiments where the 3D image dataset utilized to create the images 204,206 and model 208 is obtained and displayed in real-time, to provide a four dimensional (4D) volume 204 that includes motion, the user can reposition/navigate the probe 106 relative to the structure 200 using the information provided by the model 208 in order to shift one or more of the 2D planar images 206 being presented to obtain an improved or optimal acquisition or presentation of the of the feature(s) of the structure 200 to be imaged within one or more of the 2D planar images 206.

Figure 7:
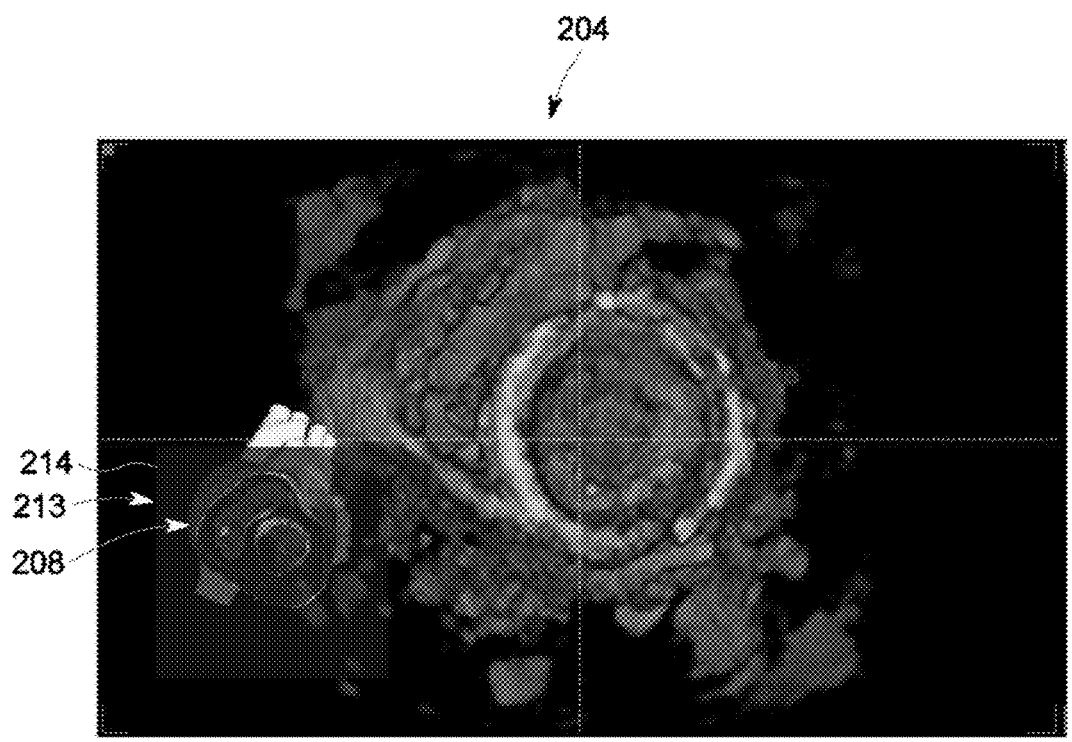
FIG. 7 is an illustration of an exemplary display of a multi-planar reconstruction view with a sliced 3D model according to another embodiment.

The model 208 in the illustrated exemplary embodiment is disposed adjacent to and partially overlapping the associated image 204,206, but can be located at any desired location within the frame 218 containing the associated image 204,206, or in a location separate from the image 204,206 on the display 118. The model 208 can be a full 3D representation of the model 208 displayed adjacent the associated image 204,206 with the icon 213/square 214 showing the location of the associated 204,206 in the model 208, as described previously, or can be shown as a model 208 that is sliced or sectioned along the plane 212 of the image 204,206 in the model 208, where the portion of the model 208 disposed between the viewer and the icon 213/square 214 is removed, allowing the viewer to see the interior structure of the model 208 corresponding to the associated image 204,206 to more clearly see the structure shown in the image 204,206, as shown in FIG. 7. The sliced model 208 can additionally be illustrated with or without the icon 213/square 214.

In addition the model 208 is interactive, such that the user can define the desire location within the model 208 for the associated 2D planar image 206 by shifting, e.g., moving, translating and/or rotating, the model 208 or the plane 214 represented on the model 208 into a different orientation for the associated 2D planar image 206. When shifting, e.g., moving, translating and/or rotating, the model 208 or the plane 214, in an exemplary embodiment, the 2D planar image 206 will correspondingly be altered to conform to the image for the plane 214 shown in association with the model 208, i.e., one of the model 208 or the plane 214 will move but the other of the model 208 or plane/square 214 will remain static, with the 2D planar image 206 changing to maintain alignment with the position of the square/plane 214 within the model 208. Conversely, the user can shift, e.g., move, translate and/or rotate the 2D planar image 206 to shift the 2D planar image 206 being presented on the display 118, and the orientation of the model 208 will shift in accordance with the altered position of the square/plane 214 within the model 208. Alternatively, when the image 206 is shifted by the user, the model 208 can remain static and the position of the square 214 representing the plane 212 of the image 206 can move to correspond to the new orientation of the image 206 relative to the model 208.

In still other exemplary embodiments, the user can interact with the model 208 by drawing lines (not shown) on the model 208 representing slices of the structure 200/model 208 desired to be shown in or as the associated 2D planar image 206. When these lines are created by the user, the model 208 will re-orient, i.e., translate and/or rotate to place the plane 212 for the desired 2D planar image 206 defined by the line in alignment with the square 214, with the 2D planar image 206 representing the desired plane 212 displayed in association with the re-oriented model 208.

In addition, while in some exemplary embodiments the alteration of the plane 212 of the 3D volume/image 204 or a 2D planar image 206 (e.g., by rotating and/or drawing on the model 208 or moving the image 206) can alter only the orientation of the associated model 208, in other embodiments the movement or alteration of the 3D volume/image 204 or one 2D planar image 206, or its associated model 208 will correspondingly passively shift the orientation of each remaining image 204,206 and the associated models 208 to maintain correspondence with the actively shifted image 204, 206.

In other exemplary embodiments, this aspect can also apply to the movement of a cursor 220 presented on the display 118 and used in association with the user interface 115. When the user is interacting with an image 204,206 and/or a mode 208 located in a particular window/quadrant/frame 218 of the display 118, the cursor 220 in that frame 218 is presented in a first color, e.g., white, to illustrate where the user is actively interacting with the display 118 through the interface 115. Other passive cursors 222 are simultaneously displayed within the other frames 218 of the display 118. As the active cursor 220 is moved by the user relative to the image 204/206 or the model 208 in the associated frame 218, the passive cursors 222 are also moved in a corresponding manner over their respective images 204, 206 and/or models 208 as a result of the registration between the images 204,206 and the model 208, to illustrate to the user where any feature selected by the active cursor 220 in one frame 218 is located by the position of one or more passive cursors 222 disposed in other frames 218.

Additionally, if a particular anatomical feature 224 of the structure 200 is desired to be highlighted in the images 204,206 (e.g., left atrial appendage, mitral valve center, right ventricle, etc.), that feature 224 can be selected in the model 208. Because the 3D anatomical model 208 is registered to the 3D volume/image 204 and the 2D planar images 206, the area 226 of the image 204,206 corresponding to the selected feature 224 of the model 208 can be highlighted, such as by providing an outline 228 in the image 204,206 representing the location of the selected feature 224 and the alignment of the feature 224. Alternatively, or in combination with an outline 228, the labeling can be performed using color coding (not shown), e.g., illustrating the left ventricle in red, right ventricle in blue, etc. within the 3D model 208 and/or as readable text (not shown) located within the associated 2D planar images 206.

Figure 5:
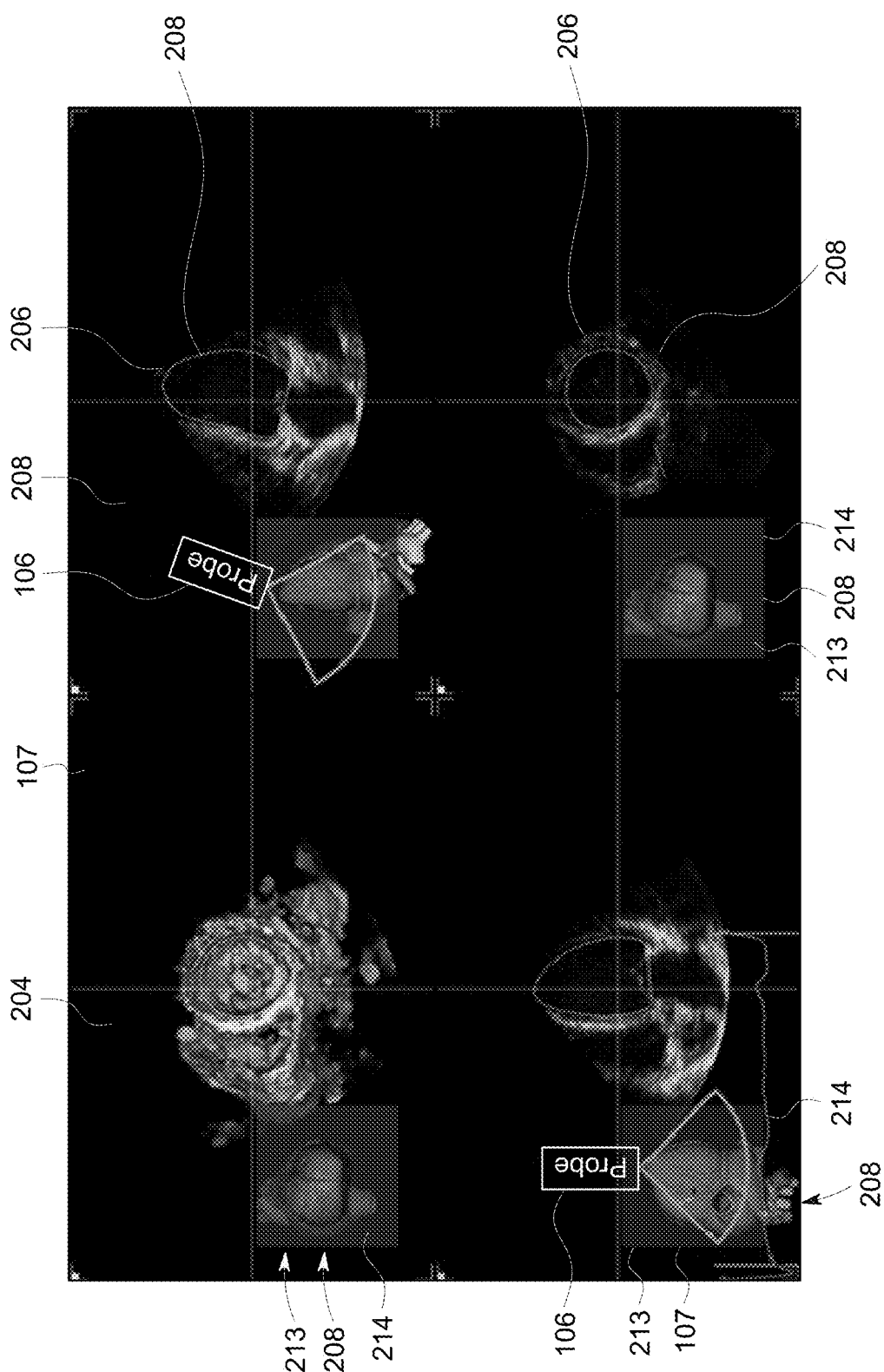
FIG. 5 is an illustration of an exemplary display of multi-planar reconstruction views with aligned and labeled 3D model according to an embodiment.

Looking now at the illustrated exemplary embodiment of FIG. 5, using the known special relationship between the 2D planar images 206 and the 3D anatomical model 208 due to the performed registration, it is also possible to illustrate the location of the probe 106 and imaging field 107 together with the anatomical model 208 consequently showing the user the direction of acquisition, further facilitating the navigation of the probe 106 by the user to obtain the desired images 204,206 for review. Further, as the probe 106 is moved to alter the image(s) 204,206 being displayed, the 3D model 208 rotates in association with the movement of the probe 106 to maintain the alignment of the model 208 with the image(s) 204,206 being displayed.

Figure 6:
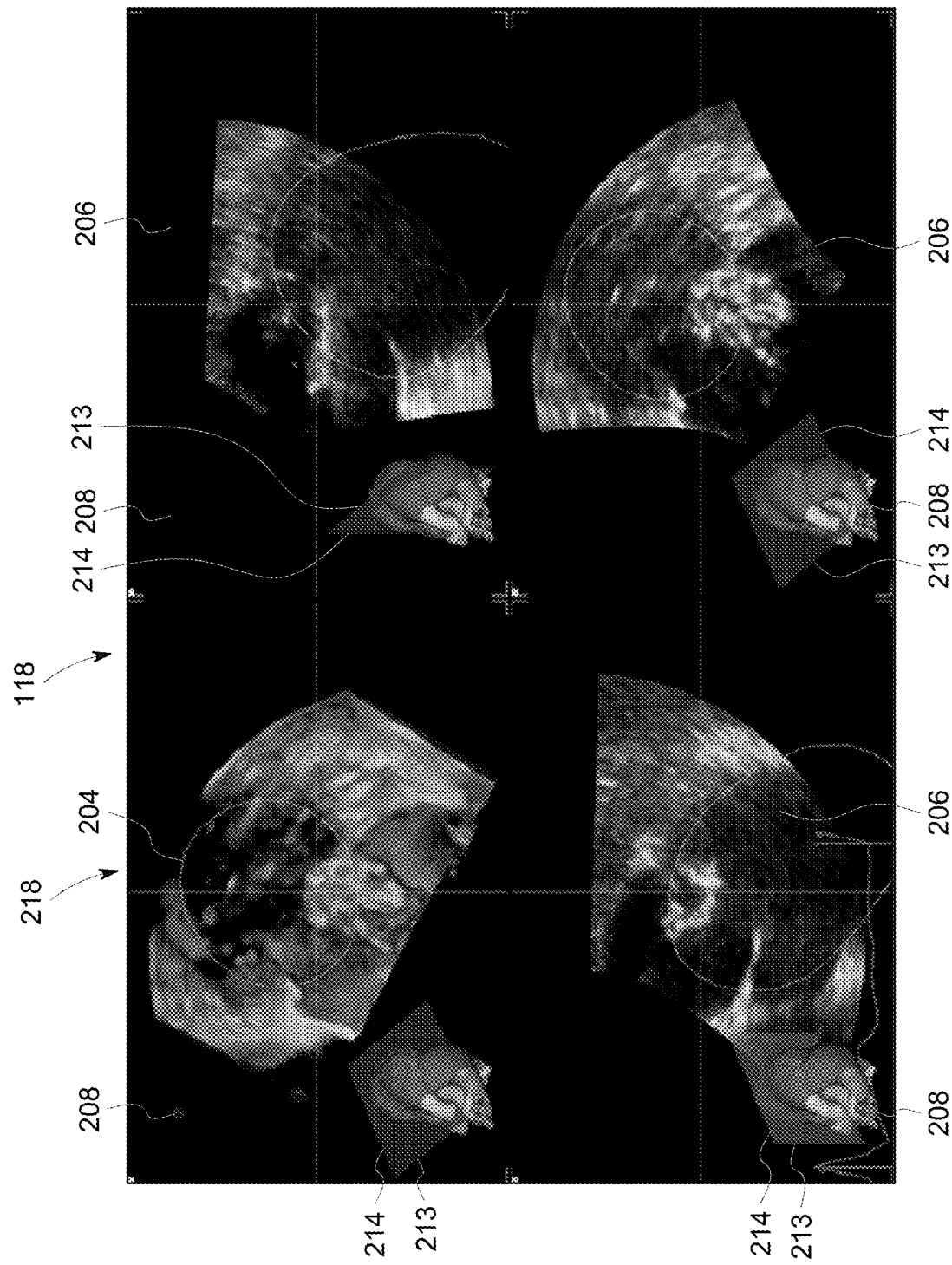
FIG. 6 is an illustration of an exemplary display of multi-planar reconstruction views with a static 3D model according to another embodiment.

Referring now to the exemplary illustrated embodiment of FIG. 6, instead of having the 3D model 208 displayed to orient the square 214 in alignment with the currently displayed 2D planar MPR image/view 206, as described with regard to previous embodiments, the model 208 for each image/view 204,206 can be positioned on the display 118 in each frame 218 at a default view, e.g. from front, from side, etc., where the location and orientation of the square 214 representing the plane 212 of the associated 2D planar view/image 206 on the 3D model 208 varies in relation to the orientation of the plane 212 relative to the 3D model 208. Further, depending upon the particular orientation of the plane 212 for the 2D planar view/image 206, the representation of the plane 212 on the 3D model 208 can be illustrated as the square 214 or a line in space (not shown).

In alternative embodiments, when the 3D dataset is acquired in real-time, such that the 3D volume 204 and the one or more 2D planar images 206 can be presented in motion, e.g., in a cine view, the registration of the 3D model 208 to the 3D volume 204 can enable the 3D model 208 to be presented in motion as a 4D model 208 along with the 3D volume 204 (4D volume 204) and 2D planar views/images 206 (3D planar images). The motion of the 3D model 208 can be determined as one or more averages of the position(s) of different structures in the 3D volume 204 and/or averages of the motion of those structures.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for displaying a three dimensional (3D) anatomical model of an anatomical structure in alignment with an ultrasound image provided using an ultrasound imaging system, the method comprising the steps of:
   a) obtaining a 3D image dataset of the anatomical structure with the ultrasound imaging system, wherein the step of obtaining the 3D image dataset consists of operating the ultrasound imaging system in an echocardiographic imaging procedure to obtain the 3D image dataset;
   b) generating a 3D volume, the 3D anatomical model, and at least one two dimensional (2D) image from the 3D image dataset;
   c) registering the 3D anatomical model to the 3D volume, wherein the step of registering the 3D anatomical model to the 3D volume comprises:
      i) registering a geometrical model of the anatomical structure to the 3D volume using segmentation; and
      ii) registering the 3D volume to the 3D anatomical model by employing a known geometric transformation matrix between the 3D anatomical model and the geometrical model; and
   d) displaying the 3D anatomical model in alignment with the at least one 2D image on a display, wherein the step of displaying the 3D anatomical model in alignment with the at least one 2D image on the display comprises:
      i interacting with the 3D anatomical model on the display through a user interface to select an anatomical feature of the anatomical structure in the 3D anatomical model presented on the display; and
      ii identifying the anatomical feature in the at least one 2D image.

2. The method of claim 1, wherein the step of identifying the anatomical feature in the at least one 2D image comprises providing an outline of the anatomical feature in the at least one 2D image.

3. The method of claim 1, wherein the step of selecting the anatomical feature in the 3D model comprises identifying the anatomical feature selected within the 3D model.

4. The method of claim 3, wherein the step of identifying the anatomical feature in the 3D model comprises providing a color to the anatomical feature in the 3D model.

5. The method of claim 1, further comprising providing a label on the anatomical feature in the at least one 2D image.

6. A method for displaying a three dimensional (3D) anatomical model of an anatomical structure in alignment with an ultrasound image provided using an ultrasound imaging system, the method comprising the steps of:
   a) obtaining a 3D image dataset of the anatomical structure with the ultrasound imaging system, wherein the step of obtaining the 3D image dataset consists of operating the ultrasound imaging system in an echocardiographic imaging procedure to obtain the 3D image dataset;
   b) generating a 3D volume, the 3D anatomical model, and a plurality of two dimensional (2D) images from the 3D image dataset;
   c) registering the 3D anatomical model to the 3D volume, wherein the step of registering the 3D anatomical model to the 3D volume comprises:
      i) registering a generic geometrical model of the anatomical structure to the 3D volume using segmentation; and
      ii) registering the 3D volume to the 3D anatomical model by employing a known geometric transformation matrix between the 3D anatomical model and the geometrical model;
   d) displaying the 3D anatomical model adjacent each of the plurality of 2D images on a display along with a plane representing an associated 2D image intersecting the 3D anatomical model; and
   e) interacting with the 3D anatomical model on the display through a user interface to shift the 3D anatomical model on the display to produce a corresponding shift to each of the plurality of 2D images and the plane representing the associated 2D image intersecting the 3D anatomical model on the display.

7. The method of claim 6, wherein the step of interacting with the 3D model comprises drawing a line on the 3D model to shift the at least one 2D image to show a plane of the 3D model oriented along the line.

8. A method for displaying a three dimensional (3D) anatomical model of an anatomical structure in alignment with an ultrasound image provided using an ultrasound imaging system, the method comprising the steps of:
   a) obtaining a 3D image dataset of the anatomical structure with the ultrasound imaging system, wherein the step of obtaining the 3D image dataset consists of operating the ultrasound imaging system in an echocardiographic imaging procedure to obtain a single-3D image dataset;
   b) generating a 3D volume, the 3D anatomical model, and at least one dimensional (2D) image from the 3D image dataset;
   c) registering the 3D anatomical model to the 3D volume; and
   d) displaying the 3D anatomical model adjacent each of the at least one 2D image on a display along with a plane representing an associated 2D image intersecting the 3D anatomical model,
   wherein the step of registering the 3D anatomical model to the 3D volume comprises:
      i) registering a geometrical model of the anatomical structure to the 3D volume using segmentation, wherein the geometrical model is not formed from patient image data; and
      ii) registering the 3D volume to the 3D anatomical model by employing a known geometric transformation matrix between the 3D anatomical model and the geometrical model.

9. The method of claim 8, wherein the step of registering the geometrical model to the 3D volume comprises performing an image segmentation process on the single 3D volume.

10. The method of claim 8, further comprising warping at least one of the geometrical model or the 3D anatomical model using the single 3D volume.

\* \* \* \* \*